(12) United States Patent
Huang et al.

(10) Patent No.: US 7,715,352 B2
(45) Date of Patent: May 11, 2010

(54) METHOD AND APPARATUS FOR A NODE TO DETERMINE A PROPER DUTY CYCLE WITHIN AN AD-HOC NETWORK

(75) Inventors: Jian Huang, Coral Springs, FL (US); Wayne Chiou, Sunrise, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 482 days.

(21) Appl. No.: 11/275,670

(22) Filed: Jan. 24, 2006

(65) Prior Publication Data
US 2007/0174465 A1 Jul. 26, 2007

(51) Int. Cl.
*H04W 4/00* (2009.01)
(52) U.S. Cl. .................. 370/338; 370/336; 455/445; 455/434; 455/432
(58) Field of Classification Search ............ 370/338; 455/434, 435.2; 445/445, 517
See application file for complete search history.

(56) References Cited

U.S. PATENT DOCUMENTS

| | | | |
|---|---|---|---|
| 7,110,380 B2 * | 9/2006 | Shvodian | 370/336 |
| 7,392,053 B1 * | 6/2008 | Conner et al. | 455/445 |
| 2002/0123345 A1 | 9/2002 | Mahany et al. | |
| 2003/0224787 A1 | 12/2003 | Gandolfo | |
| 2004/0208152 A1 | 10/2004 | Perkins et al. | |
| 2005/0171662 A1 | 8/2005 | Strege et al. | |

FOREIGN PATENT DOCUMENTS

WO 2007087466 A2 8/2007

OTHER PUBLICATIONS

German Patent Office Rejection dated Jan. 23, 2009 (with English Translation)- 6 pages.
PCT/US07/060229 - International Search Report with Written Opinion mailed Oct. 26, 2007 - 8 pages.
PCT/US07/060229 - International Preliminary Report mailed Aug. 7, 2007 - 6 pages.

* cited by examiner

*Primary Examiner*—David Q Nguyen

(57) ABSTRACT

A method and apparatus for determining a node's proper duty cycle is provided herein. All nodes (500) within a network (100) will interactively switch duty-cycles based on a number of hops a device is from a personal area network coordinator PNC. Changing duty cycles based on a number of hops from a PNC assures that spatial patterns of duty-cycles form in a network to maximize data throughput and minimize network wide power consumptions.

14 Claims, 5 Drawing Sheets

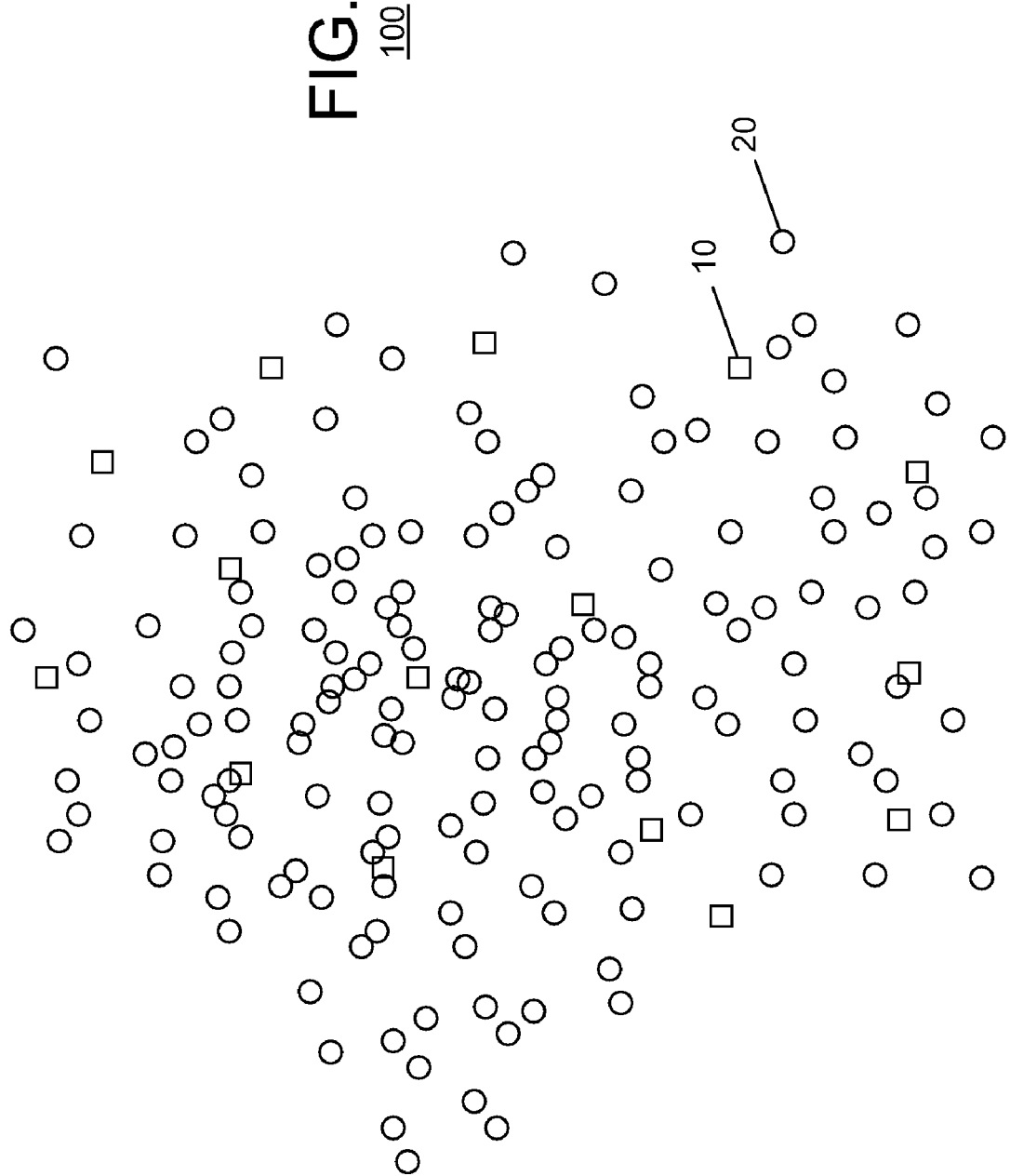

500

METHOD AND APPARATUS FOR A NODE TO DETERMINE A PROPER DUTY CYCLE WITHIN AN AD-HOC NETWORK

FIELD OF THE INVENTION

The present invention relates generally to ad-hoc networks, and in particular, to a method and apparatus for a node to determine a proper duty cycle within an ad-hoc network.

BACKGROUND OF THE INVENTION

Low power consumption, and thus long battery life, is critical to the success of next-generation ad-hoc wireless devices. With this in mind, many ad-hoc networks allow nodes to periodically sleep, or power down, in order to conserve battery life. The period of activity and inactivity is usually referred to as a nodes duty cycle (DC). Amounts of data traffic a node experiences will require a certain duty-cycle in order to properly transmit the data within a reasonable time period (i.e., to have a reasonable data delivery rate). Heavy load demands a full duty-cycle while a light load will allow for a low duty-cycle. A technique to determine a node's proper duty cycle is essential to efficient operation. Therefore, a need exists for a method and apparatus for a node to determine a proper duty cycle within an ad-hoc network.

BRIEF DESCRIPTION OF THE DRAWINGS

FIG. 1 is a block diagram of an ad-hoc network.

DETAILED DESCRIPTION OF THE DRAWINGS

In order to address the above-mentioned need, a method and apparatus for determining a node's proper duty cycle is provided herein. Particularly, all nodes within a network will interactively switch duty-cycles based on a number of hops a device is from a personal area network coordinator PNC. Changing duty cycles based on a number of hops from a PNC assures that spatial patterns of duty-cycles form in a network to maximize data throughput and minimize network wide power consumptions.

The present invention encompasses a method for a node to determine a proper duty cycle (DC) within an ad-hoc network. The method comprises the steps of determining a number of hops the node is from a coordinating node and adjusting the duty cycle based on the number of hops the node is from the coordinating node.

The present invention additionally encompasses an apparatus comprising logic circuitry determining a number of hops the node is from a coordinating node and adjusting the duty cycle based on the number of hops the node is from the coordinating node.

The present invention additionally encompasses a method for a node to determine a proper duty cycle within an ad-hoc network. The method comprises the steps of determining a duty cycle for an upstream node and adjusting the duty cycle based on the duty cycle for the upstream node.

Turning now to the drawings, wherein like numerals designate like components, FIG. 1 illustrates network 100. Network 100 preferably utilizes a network protocol defined by 802.15.3 Wireless Personal Area Networks for High Data Rates or IEEE 802.15.4 Low Rate Wireless Personal Area Networks. However one of ordinary skill in the art will recognize that other network protocols may be utilized without varying from the scope of the invention. For example, network 100 may utilize network protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc. As shown, network 100 includes a number of coordinating device (also referred to as a root node, root zero node, or personal area network (PAN) coordinator) 10 and a larger number of slave nodes 20 in communication with coordinating device 10. Nodes 20 represent devices that communicate with each other through synchronization provided by coordinating devices 10. Nodes 20 can be transportable (mobile) or they can be fixed in a given place.

Figure 2:
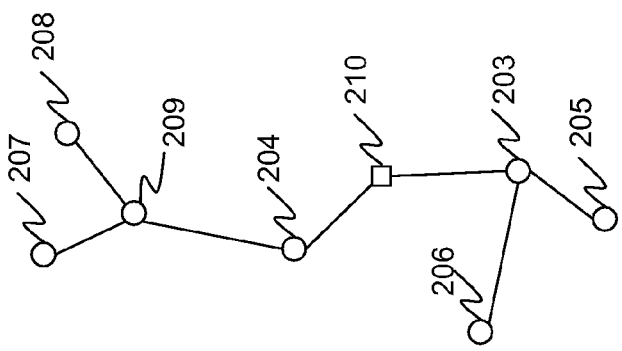
FIG. 2 is a more-detailed block diagram of the network of FIG. 1.

FIG. 2 is a more-detailed view of system 100, showing PAN coordinator (PNC) 210 and nodes 203-209. In one embodiment of the present invention a network transmission protocol is used as described in U.S. patent application Ser. No. 10/304,428 and Zigbee Release 1.0. All communication will pass through PNC 210. PNC 210 is responsible for timing and synchronization of the devices within a PAN, for assigning unique network logical addresses, for inter PAN routing messages, for broadcasting device discovery and service discovery information, and possibly for power control. Each PNC 210 can have up to a maximum number ($C_m$) of children nodes under it. In a similar manner, each child node can have up to $C_m$ child nodes. Thus, for example, in FIG. 2, PNC 210 has two child nodes (nodes 203 and 204) associated with it. In a similar manner, child node 209 also has two child nodes (nodes 207 and 208) associated with it.

Within the ad-hoc network, any node can be any number of hops away from a PNC node up to Lm which is the maximum number of hops allowed in the entire network. With reference to FIG. 2, nodes 207 and 208 are three hops away from PNC 210, while nodes 205, 206, and 209 are two hops away from root node 210. Finally, nodes 203 and 204 are one hop away from PNC 210.

Figures 3, 4:
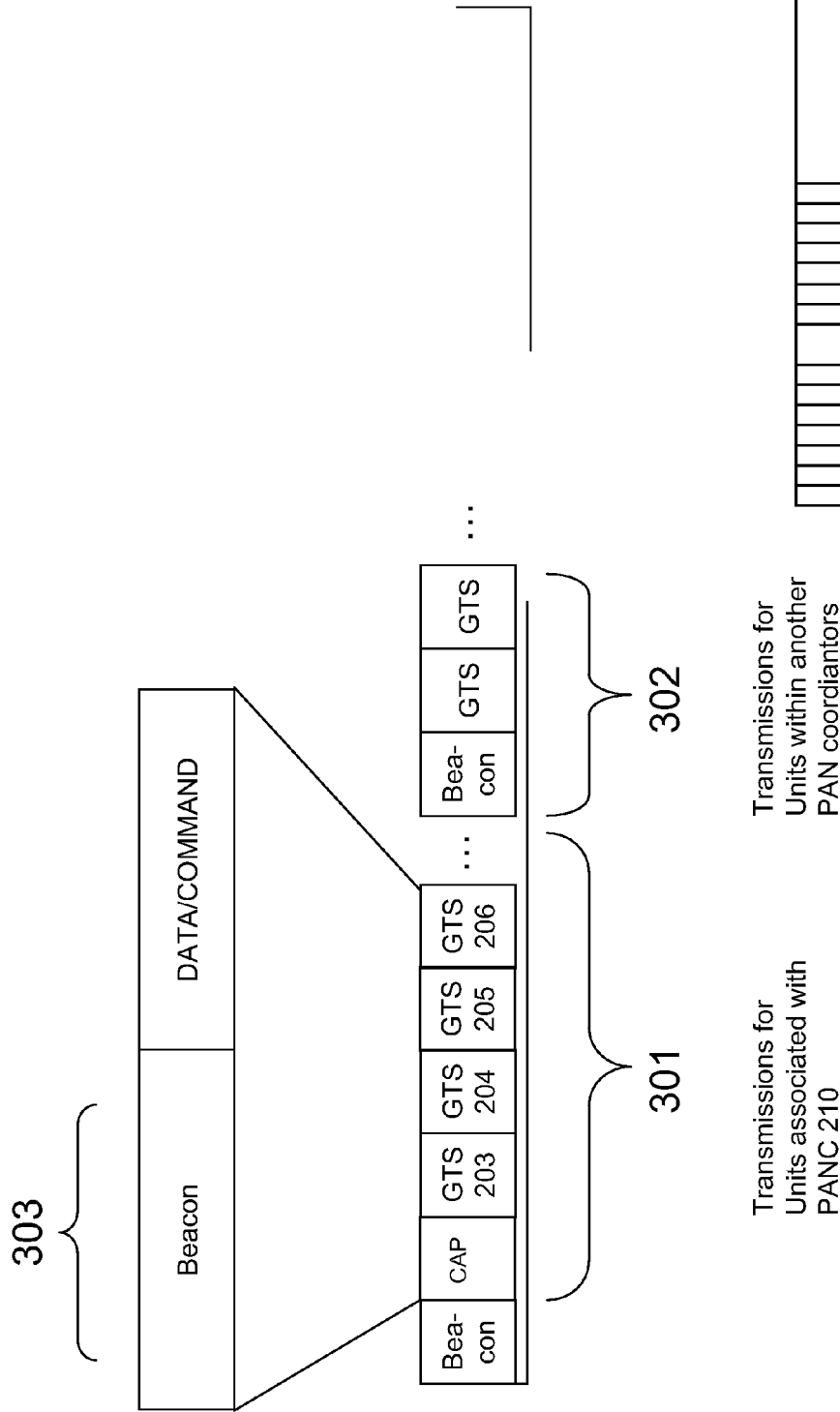
FIG. 3 illustrates a superframe structure for the network of FIG. 1 and FIG. 2.
FIG. 4 is a more-detailed view of the superframe structure of FIG. 3.

FIG. 3 illustrates a transmission scheme for the network of FIG. 2. During communications among devices 201-208, a specific transmission protocol is utilized by network 100 wherein each PAN communicates within a particular non-overlapping superframe 301, 302 as described in U.S. patent application Ser. No. 10/414,838. With reference to FIG. 2, nodes associated with PNC 210 complete all necessary transmissions within superframe 301, while nodes associated with another piconet completes all necessary transmissions within superframe 302. During a superframe, a particular PNC will broadcast PAN timing and control information within a beacon field, while each node (including the coordinator (PNC)) will have a Contention Access Period (CAP) and a Contention Free Period slot, part of the Channel Time Allocation (CTA) facility of the IEEE 802.15.3 standard, for transmission. During its guaranteed time slot, a particular node broadcasts any command (COM) wishing to be executed to any particular node or may send data intended for a single node or set of nodes.

During the time slot, the node also broadcasts a beacon. In a beacon enabled ad-hoc sensor network, a network association is initiated with a node scanning the proximity and discovering beacons which serves as invitation to join the network. When a node completes the network association, it begins transmitting its own beacons as a means of time synchronization and as a signal of association invitation. The beacon interval (BI) and superframe length or duration (SD) are determined by Beacon Order (BO) and Superframe Order (SO), respectively as BI=2^(BO) where BO=0, 1, 2, . . . , 14 and SD=2^(SO) where SO=1, 2, . . . , BO. The duty-cycle is defined as SD/BI. This is illustrated in FIG. 4.

In ad-hoc wireless networks it is often advantageous to allow devices to sleep for extended periods to increase battery life. Therefore, when a node has no data to transmit, or does not wish to listen to other node's transmissions, the node will enter a sleep mode, powering down its transceiver. The node will awake when it is time for the node to again transmit its beacon signal. As discussed above, amounts of data traffic a node experiences will require a certain duty-cycle in order to achieve a proper value of data delivery ratio. Heavy load demands a full duty-cycle (short beacon interval) while a light load will allow for a low duty-cycle. A technique to determine a node's proper duty cycle is essential to efficient operation. In order to address this issue, nodes within network 100 will interactively switch duty-cycles based on a number of hops a device is from a personal area network coordinator. Changing duty cycles based on a number of hops from a PNC assures that spatial patterns of duty-cycles form in a network to maximize data throughput and minimize network wide power consumptions.

The steps for determining a node's duty cycle are based on required traffic load (R) derived from required data delivery ratio, current Superframe Order (SO), and Maximum Hop number (HMAX). The data traffic load as a function of data delivery ratio can be obtained through simulations, measurements, or other means. Therefore, the threshold values of data traffic to allow global full duty-cycle R1, low duty-cycle R2, and duty-cycle gradient mode, are determined for given total number of nodes N in a coverage area A.

(i) When R is larger than a threshold R1, the node switches to a maximum duty-cycle (DC=DMAX).
(ii) When R is less than a threshold R2, the node switches to a minimum duty-cycle (DC=DMIN)
(iii) When R is between R1 and R2 (i.e., R2<R<R1), the node switches to a "duty-cycle gradient" mode (DMIN<DC<DMAX). In a first embodiment of the present invention, the duty cycle is based on a number of hops a node is from a PNC. SO is then adjusted based on the number of hops to the root node. In a second embodiment of the present invention the duty-cycle is based on the duty cycle of the neighboring node. In particular, SO of the neighboring node is obtained, and then decreased by one. The resulting SO is allow to have the format of integer or fraction by defining SO'=mSO".

Figure 5:
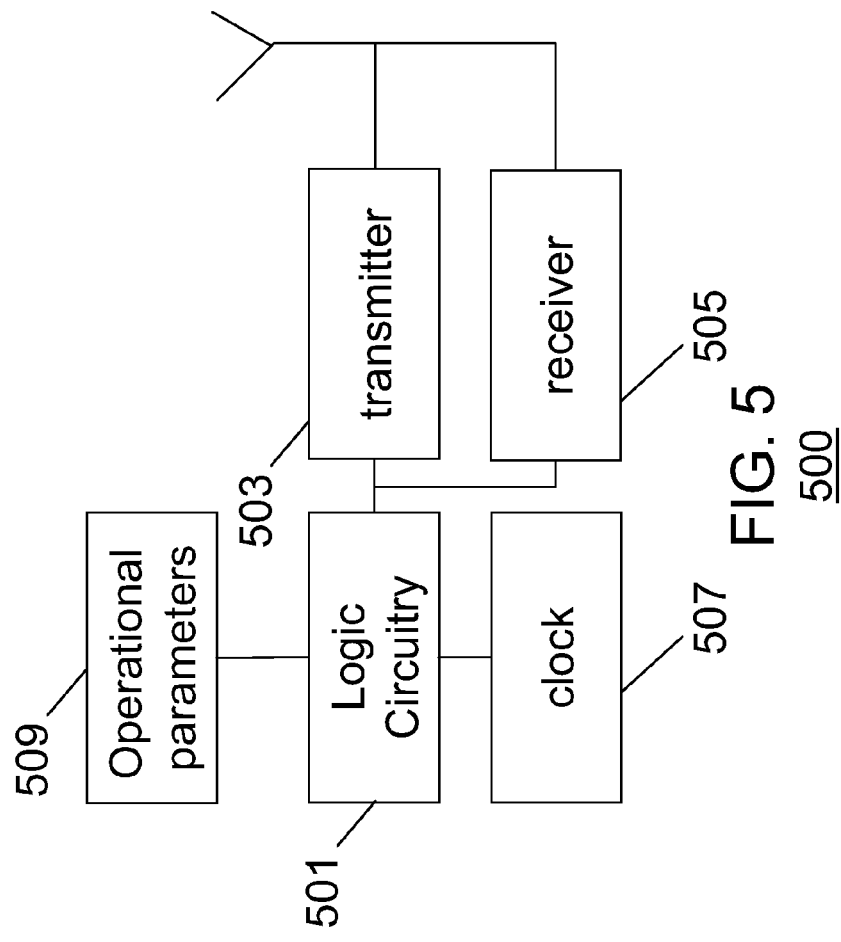
FIG. 5 is a block diagram of a node.

FIG. 5 is a block diagram of node 500. As shown, node 500 comprises transmitter 503 and receiver 505, in turn, coupled to logic circuitry 501. Operational parameters database 509 is provided to store network parameters such as SO, R1, R2, DCMIN, DCMAX, DC, HMAX, and HMIN. Clock 507 serves as timing means to properly time synchronize node 500 to the correct system time. Although various forms for node 500 are envisioned, in a preferred embodiment of the present invention node 500 is formed from a Freescale Inc. MC13192 transceiver (transmitter 504 and receiver 505) coupled to a Motorola HC08 8-bit processor 501.

Figure 6:
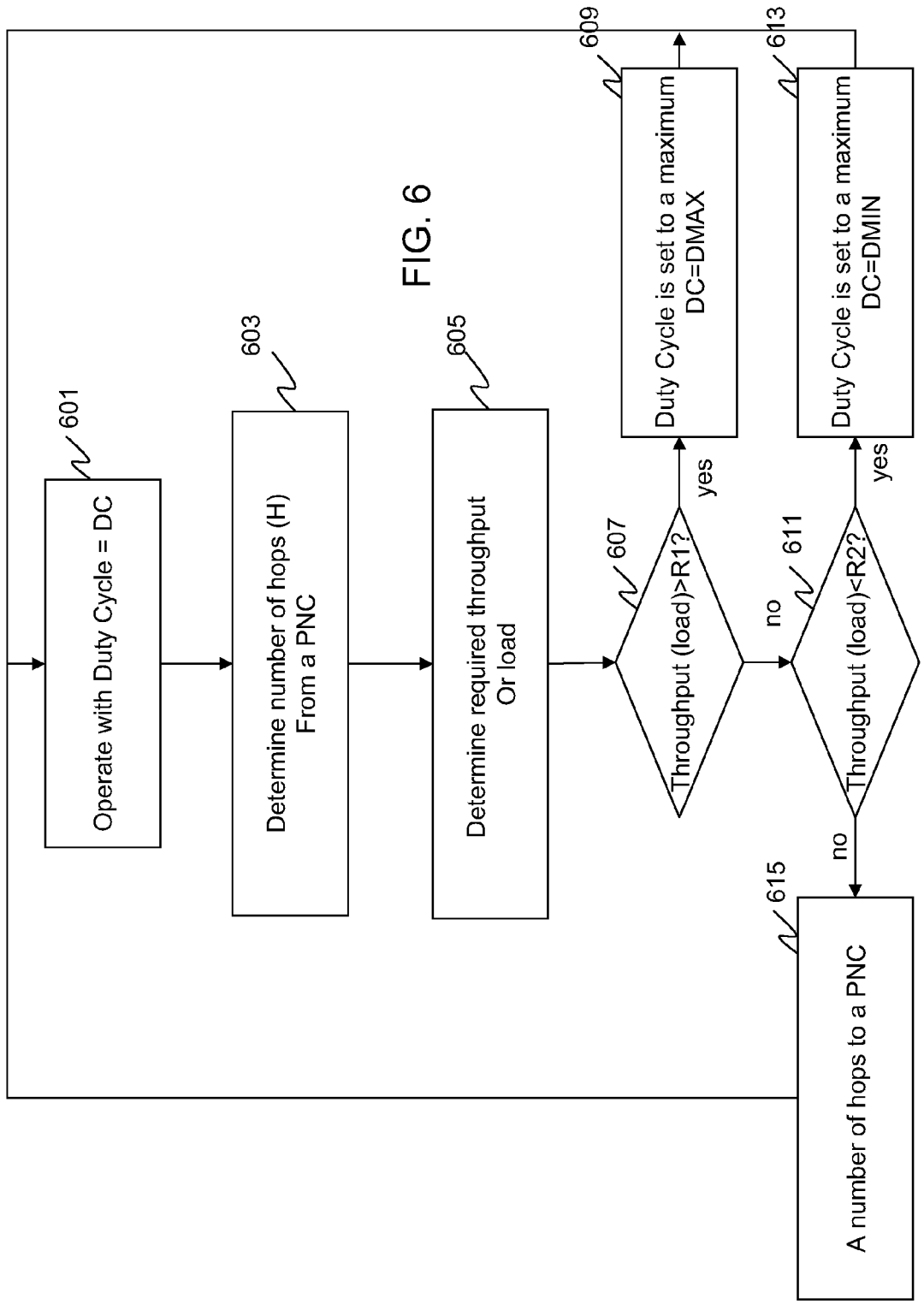
FIG. 6 is a flow chart showing operation of the node of FIG. 5.

FIG. 6 is a flow chart showing operation of node 500 in accordance with the first embodiment of the present invention. In the first embodiment of the present invention the duty cycle of node 500 is based upon a number of hops to the root node (PNC). The logic flow begins at step 601 where node 500 is operating with a particular duty cycle (e.g., DC). At step 603 logic circuitry 501 accesses database 509 and determines a number of hops (H) from a PNC. At step 605, logic circuitry 501 access database 509 and determines its current required data throughput or load. This is accomplished by analyzing how much data was transmitted by transmitter 503 over a previous period of time (e.g., the previous 10 seconds). At step 607 logic circuitry 501 determines if the current data load is greater than a first threshold (R1) and if so, the logic flow continues to step 609 where the duty cycle is set to a maximum value (DMAX=1). If, it is determined that the current data load is not greater than R1, then the logic flow continues to step 611 where logic circuitry 501 determines if the current load is less than a second threshold (R2). If, at step 611 it is determined that the current load is less than R2, then the logic flow continues to step 613 where the duty cycle is set to a minimum value (DMIN) and the logic flow returns to step 601.

If the data load is not greater than R1 and not less than R2, the logic flow continues to step 615 where the duty cycle is adjusted based on a number of hops to its PNC. In the first embodiment of the present invention, the duty cycle is adjusted by increasing or decreasing SO from the default value set before a network deployment. SO is set to increase or decrease between $SO_{min}$ and $SO_{max}$ as H increases or decreases between 0 and HMAX. Thus, when H=0, SO is set to $SO_{max}$ and when H=HMAX, SO is set to $SO_{min}=SO_{max}-$HMAX When H is between 0 and HMAX, SO decreases linearly between $SO_{max}$ and $SO_{min}$. Specifically, for given hop count H, SO=m($SO_{max}$-H) where H=0, 1 . . . HMAX. For example, when $SO_{max}$=7, HMAX=4, the value of SO of a node having H=2 is equal to 5 if m=1. where m is a constant. Because DC=SD/BI=2^(SO)/2^(BO), decreasing SO results in decreasing the duty cycle and vice versa.

Figure 7:
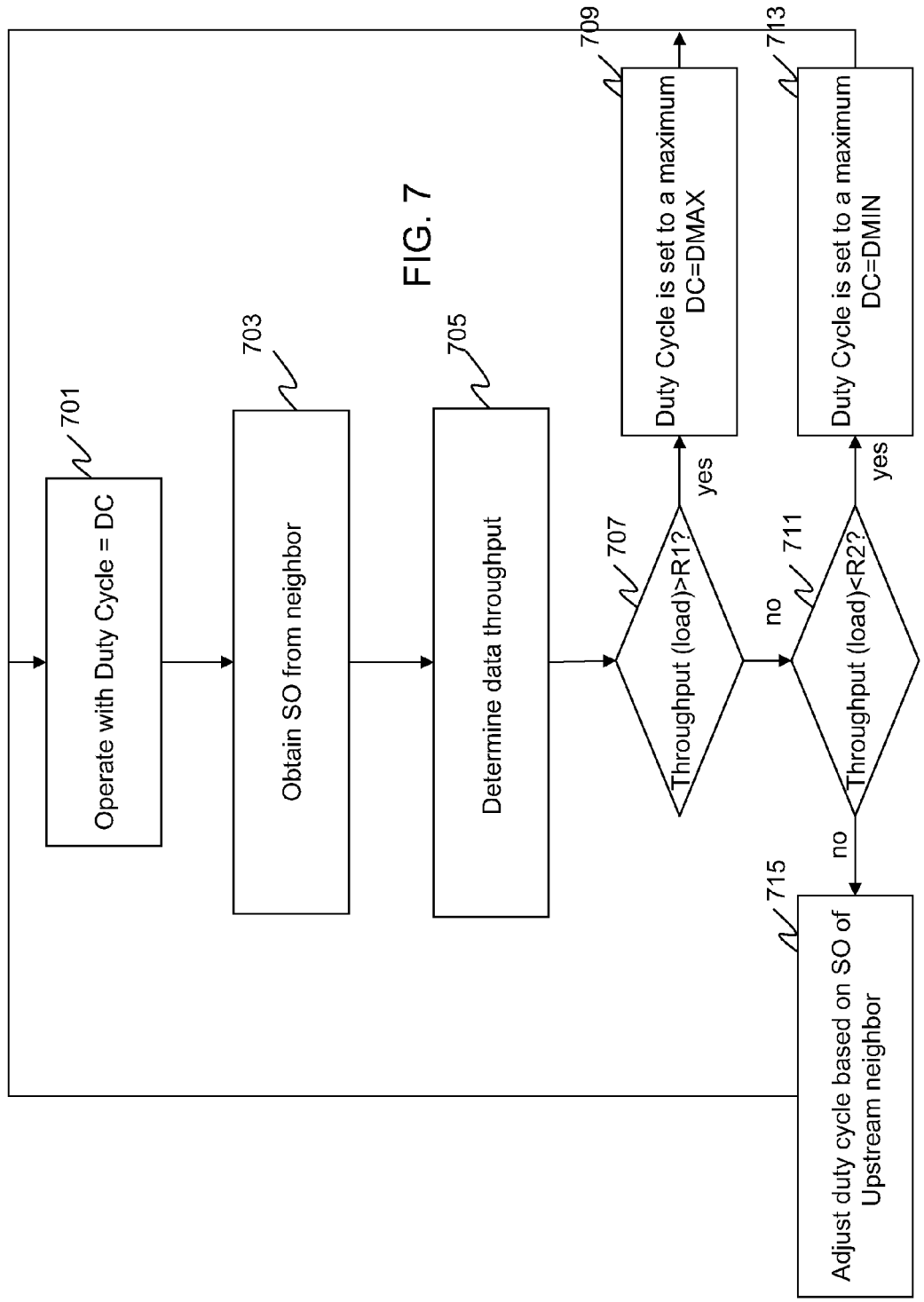
FIG. 7 is a flow chart showing operation of the node of FIG. 5.

FIG. 7 is a flow chart showing operation of node 500 in accordance with the second embodiment of the present invention. In the second embodiment of the present invention the duty cycle of node 500 is based on the duty cycle of its parent node. In particular, the duty cycle of node 500 is decreased incrementally from its parent node. The logic flow begins at step 701 where node 500 is operating with a particular duty cycle (e.g., DC). At step 703 logic circuitry 501 accesses database 509 and obtains current value of SO of the upstream node (parent). At step 705, logic circuitry 501 determines its current required data throughput. This is accomplished by analyzing how much data was transmitted by transmitter 503 over a previous period of time (e.g., the previous 10 seconds). At step 707 logic circuitry 501 determines if the current data load is greater than a first threshold (R1) and if so, the logic flow continues to step 709 where the duty cycle is set to a maximum value (DMAX=1). If, it is determined that the current data load is not greater than R1, then the logic flow continues to step 711 where logic circuitry 501 determines if the current load is less than a second threshold (R2). If, at step 711 it is determined that the current load is less than R2, then the logic flow continues to step 713 where the duty cycle is set to a minimum value (DMIN) and the logic flow returns to step 701.

If the data load is not greater than R1 and not less than R2, the logic flow continues to step 715 where the duty cycle is adjusted based on the duty cycle of its neighboring node. In the second embodiment of the present invention the duty cycle is set based on the duty cycle of its neighboring node, and in particularly decreased from that of the neighboring node. Thus after determining SO for the neighboring node ($SO_{neighbor}$) SO is set to $SO_{neighbor}-1$ until SO reaches a minimum value, at which point SO will not be decreased.

The above logic flow results in logic circuitry 501 adjusting the duty cycle based on the SO values of its upstream neighbor (FIG. 7) and a number of hops the node is from the coordinating node (FIG. 6). While the invention has been particularly shown and described with reference to a particular embodiment, it will be understood by those skilled in the art that various changes in form and details may be made therein without departing from the spirit and scope of the invention. For example, while the duty cycle was modified by changing SO, it should be noted that other techniques for modifying the duty cycle based on upstream neighboring node or hops to a PNC are envisioned. The same principles described above can be applied to the case when a superframe is fragmented. That is when a superframe defined as shown in the FIG. 4 is divided into sub-structures containing active and inactive time periods. In addition, while the superframe structure of IEEE802.15.4/Zigbee was utilized by network 100, the same duty-cycle management scheme can apply to other superframe structures. It is intended that such changes come within the scope of the following claims.

The invention claimed is:

1. A method for a node to determine a proper duty cycle (DC) within an ad-hoc network, the method comprising the steps of:
   determining a number of hops the node is from a coordinating node; and
   adjusting the duty cycle based on the number of hops the node is from the coordinating node.

2. The method of claim 1 wherein the steps of determining the number of hops the node is from the coordinating node comprises the step of determining the number of hops the node is from a personal area network coordinator (PNC).

3. The method of claim 1 wherein the step of adjusting the duty cycle comprises the step of adjusting the duty cycle by modifying a superframe order (SO).

4. The method of claim 3 wherein the duty cycle is set to $DC=SD/BI=2^{(SO)}/2^{(BO)}$, where BI is a beacon interval and SD is a superframe length and wherein BO=0, 1, 2, ... 14 and $SD=2^{(SO)}$ where SO=1, 2, ... BO.

5. The method of claim 1 wherein the step of adjusting the duty cycle further comprises the step of adjusting the duty cycle based on a required data throughput (R).

6. The method of claim 5 wherein the duty cycle is set to a maximum value when R is larger than a first threshold R1.

7. The method of claim 6 wherein the duty cycle is set to a minimum value when R is less than a second threshold R2.

8. An apparatus comprising:
   logic circuitry determining a number of hops the node is from a coordinating node and adjusting the duty cycle based on the number of hops the node is from the coordinating node.

9. The apparatus of claim 8 wherein the coordinating node comprises a personal area network coordinator (PNC).

10. The apparatus of claim 8 wherein the logic circuitry modifies a superframe order (SO) to adjust the duty cycle.

11. The apparatus of claim 8 wherein the duty cycle is set to $DC=SD/BI=2^{(SO)}/2^{(BO)}$, where BI is a beacon interval and SD is a superframe length and wherein BO=0, 1, 2, ... 14 and $SD=2^{(SO)}$ where SO=1, 2, ... BO.

12. The apparatus of claim 8 wherein the logic circuitry further adjusts the duty cycle based on a required data throughput (R).

13. The apparatus of claim 12 wherein the duty cycle is set to a maximum value when R is larger than a first threshold R1.

14. The apparatus of claim 13 wherein the duty cycle is set to a minimum value when R is less than a second threshold R2.

* * * * *

UNITED STATES PATENT AND TRADEMARK OFFICE
CERTIFICATE OF CORRECTION

PATENT NO.         : 7,715,352 B2
APPLICATION NO.    : 11/275670
DATED              : May 11, 2010
INVENTOR(S)        : Huang et al.

It is certified that error appears in the above-identified patent and that said Letters Patent is hereby corrected as shown below:

Title Page, Item (75), under "Inventors", in Column 1, Line 2, delete "Wayne Chiou," and insert -- Wayne W. Chiou, --, therefor.

In Fig. 3, Sheet 3 of 5, below Tag "301", in Line 3, delete "PANC" and insert -- PNC --, therefor.

In Column 3, Line 42, delete "(DC=DMIN)", and insert -- "(DC=DMIN). --, therefor.

In Column 4, Line 34, delete "m=1. where", and insert -- "m-1, where --, therefor.

Signed and Sealed this
Sixth Day of November, 2012

David J. Kappos
*Director of the United States Patent and Trademark Office*